United States Patent
Hayami et al.

(10) Patent No.: US 11,434,352 B2
(45) Date of Patent: Sep. 6, 2022

(54) RUBBER COMPOSITION AND PNEUMATIC TIRE

(71) Applicant: Toyo Tire Corporation, Itami (JP)

(72) Inventors: Jumpei Hayami, Itami (JP); Yuki Hidaka, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 143 days.

(21) Appl. No.: 16/856,138

(22) Filed: Apr. 23, 2020

(65) Prior Publication Data

US 2020/0339787 A1 Oct. 29, 2020

(51) Int. Cl.
| | | |
|---|---|---|
| *C08L 9/06* | (2006.01) | |
| *B60C 1/00* | (2006.01) | |
| *B60C 11/00* | (2006.01) | |
| *D01F 6/70* | (2006.01) | |

(52) U.S. Cl.
CPC ............. *C08L 9/06* (2013.01); *B60C 1/0016* (2013.01); *B60C 11/0008* (2013.01); *D01F 6/70* (2013.01); *B60C 2011/0025* (2013.01); *C08L 2207/04* (2013.01)

(58) Field of Classification Search
CPC ...... C08L 9/06; C08L 2207/04; B60C 1/0016; B60C 11/0008; B60C 2011/0025
USPC ......................................................... 524/198
See application file for complete search history.

(56) References Cited

U.S. PATENT DOCUMENTS

| | | | | |
|---|---|---|---|---|
| 5,225,457 A | * | 7/1993 | Borowczak | ............... C08J 5/047 523/220 |
| 2010/0113703 A1 | | 5/2010 | Houjo et al. | |
| 2016/0176999 A1 | | 6/2016 | Fukunishi et al. | |
| 2018/0187337 A1 | * | 7/2018 | Iseki | .................. C08G 18/2081 |

FOREIGN PATENT DOCUMENTS

| | | | |
|---|---|---|---|
| JP | 8-27313 A | | 1/1996 |
| JP | 2002-338815 | * | 11/2002 |
| JP | 2008-169295 A | | 7/2008 |
| JP | 2016-117880 A | | 6/2016 |
| WO | WO 2017/002682 | * | 1/2017 |

OTHER PUBLICATIONS

Machine translation of JP 2002-338815 (Year: 2002).*

* cited by examiner

*Primary Examiner* — Doris L Lee
(74) *Attorney, Agent, or Firm* — WHDA, LLP

(57) ABSTRACT

A rubber composition comprising a diene rubber and a liquid crystal elastomer. It is preferred that the liquid crystal elastomer has a (liquid crystal phase)-to-(isotropic phase) transition temperature (Ti) of 20° C. or less. It is preferred that the liquid crystal elastomer has a functional group that reacts with the diene rubber. It is preferred that the functional group is a functional group containing at least a sulfur atom. It is preferred that the liquid crystal elastomer is a liquid crystal polyurethane elastomer. Moreover, it is preferred that the liquid crystal polyurethane elastomer is a reaction product of a mesogenic group-containing compound having at least an active hydrogen group, an isocyanate compound, a polysulfide-containing compound, and a photopolymerizable group-containing compound.

15 Claims, No Drawings

RUBBER COMPOSITION AND PNEUMATIC TIRE

BACKGROUND OF THE INVENTION

Field of the Invention

The present invention relates to a rubber composition and a pneumatic tire including the rubber composition.

Description of the Related Art

In general, tires are used in various driving environments, and for example, it is required to improve wet grip performance (hereinafter, also simply referred to as "WET performance"), which is grip performance on a wet road surface in the rain. However, when the formulation of the rubber composition is designed for the purpose of improving the WET performance, the fuel efficiency of a resulting vulcanized rubber may be deteriorated. Therefore, a technology for improving these performances in a well-balanced manner has been required.

In Patent Document 1 below discloses a technology to improve the WET performance and the fuel efficiency of a pneumatic tire by using a rubber composition containing, as rubber components, at least two diene rubbers whose temperature dispersion curve of tan δ is bimodal.

Further, in Patent Document 2 below is disclosed a technology to improve the initial grip performance and the driving stability of tires by using, as a raw material, a rubber composition in which a prescribed amount of at least one species selected from among homopolymer resins and copolymer resins of an aromatic vinyl compound each having a softening point of 140° C. or higher is compounded.

Further, Patent Document 3 below discloses a technology to improve the WET performance and the fuel efficiency of a pneumatic tire by using, as a raw material, a rubber composition containing a liquid copolymer that contains an aromatic vinyl compound and a conjugated diene-containing compound as monomer units and has a weight-average molecular weight (Mw) of 1,000 to 50,000.

PRIOR ART DOCUMENTS

Patent Documents

[Patent Document 1] JP-A-08-27313
[Patent Document 2] JP-A-2008-169295
[Patent Document 3] JP-A-2016-117880

SUMMARY OF THE INVENTION

In order to well achieve both the WET performance and the fuel efficiency of a pneumatic tire, it is important to optimize the loss tangent (tan δ) of the rubber composition to be used as a raw material. In general, WET performance greatly depends on the tan δ at 0° C. (hereinafter also referred to as "tan δ (0° C.)") of a rubber composition as a raw material, and the larger the tan δ (0° C.) is, the better in WET performance the pneumatic tire is. On the other hand, the fuel efficiency greatly depends on the tan δ at 60° C. (hereinafter also referred to as "tan δ (60° C.)") of the rubber composition to be used as a raw material, and the smaller the tan δ (60° C.) is, the better in fuel efficiency the pneumatic tire is.

It, however, has been found that it is difficult to increase the tan δ (0° C.) of a rubber composition and to reduce the tan δ (60° C.) by the technologies disclosed in the patent literature cited above and it is also difficult to improve the WET performance and the fuel efficiency of a pneumatic tire as a final product in a well-balanced manner. The present invention has been completed in view of the above circumstances, and has as its object to improve the balance between the tan δ (0° C.) and the tan δ (60° C.) of a rubber composition.

The above object can be achieved by the present invention as described below. That is, the present invention relates to a rubber composition containing a diene rubber and a liquid crystal elastomer.

Liquid crystal elastomers exhibit specific dynamic viscoelasticity as compared with diene rubbers, and have high heat loss over a wide temperature range. Therefore, when a liquid crystal elastomer is compounded in addition to a diene rubber, the tan δ (0° C.) of the rubber composition can be increased and the tan δ (60° C.) can be reduced.

In the above rubber composition, it is preferable that the liquid crystal elastomer be one having a (liquid crystal phase)-to-(isotropic phase) transition temperature (Ti) of 20° C. or less. tan δ is expressed by the ratio of a loss modulus (E") to a storage modulus (E') (tan δ=E"/E'). In the case where a liquid crystal elastomer having Ti of 20° C. or less is compounded in a rubber composition, since the vicinity of 0° C. is relatively close to Ti and 60° C. is away from Ti, E' sharply decreases as compared to E" at around 0° C., so that tan δ greatly increases. On the other hand, since the liquid crystal elastomer is present in the isotropic phase at around 60° C., E" and E' both decrease gradually, so that the increase of tan δ is suppressed. As a result, the balance between the tan δ (0° C.) and the tan δ (60° C.) of the rubber composition can be improved at a higher level.

In the rubber composition, the liquid crystal elastomer is preferably one having a functional group capable of reacting with the diene rubber. According to such a configuration, the dispersibility of the liquid crystal elastomer in the diene rubber is improved and the balance between the tan δ (0° C.) and the tan δ (60° C.) of the rubber composition can be further improved, and the rubber properties of a finally obtained vulcanized rubber are also improved. In the rubber composition, the functional group is more preferably a functional group containing at least a sulfur atom.

In the rubber composition, the liquid crystal elastomer is preferably a liquid crystal polyurethane elastomer. The liquid crystal polyurethane elastomer either may be a reaction product of a mesogenic group-containing compound having at least an active hydrogen group, an isocyanate compound, a polysulfide-containing compound, and a photopolymerizable group-containing compound, or may be a reaction product of a mesogenic group-containing compound having at least an active hydrogen group, an isocyanate compound, a polysulfide-containing compound, and a polyfunctional compound. In these configurations, since the liquid crystal polyurethane elastomer exhibits high liquid crystallinity derived from the mesogenic group-containing compound and elasticity derived from the isocyanate compound, the liquid crystal polyurethane elastomer can improve the balance between the tan δ (0° C.) and the tan δ (60° C.) at a higher level when the liquid crystal polyurethane elastomer is compounded in a rubber composition. Furthermore, in these configurations, since the liquid crystal polyurethane elastomer has a polysulfide structure in the molecule thereof, the liquid crystal polyurethane elastomer reacts with a rubber component via the polysulfide structure when the liquid crystal polyurethane elastomer is compounded in a rubber composition and the rubber composition is vulcanized. As a result, the liquid crystal polyurethane elastomer is highly dispersed in the rubber component, so that the balance between the tan δ (0° C.) and the tan δ (60° C.) of the rubber composition can be improved at a higher level.

In the rubber composition, the loading of the liquid crystal elastomer is preferably 1 to 50 parts by mass where the total amount of the diene rubber is 100 parts by mass. In this case, the tan δ (0° C.) of the rubber composition can be further increased, and the tan δ (60° C.) can be further reduced.

Further, the present invention relates to a rubber composition containing a diene rubber and a polymer filler containing at least a liquid crystal polymer and having an average particle diameter of 500 μm or less.

Liquid crystal polymers exhibit specific dynamic viscoelasticity as compared with diene rubbers, and have high heat loss over a wide temperature range. For this reason, when compounding a polymer filler containing at least a liquid crystal polymer and having an average particle diameter of 500 μm or less in addition to a diene rubber, it is possible to increase the tan δ (0° C.) of the rubber composition and reduce the tan δ (60° C.) Furthermore, the dispersibility of the polymer filler in the rubber component is improved by designing the average particle diameter of the polymer filler to be 500 μm or less. As a result, the balance between the tan δ (0° C.) and the tan δ (60° C.) of the rubber composition can be improved at a high level.

In the above rubber composition, it is preferable that the liquid crystal polymer be one having a (liquid crystal phase)-to-(isotropic phase) transition temperature (Ti) of 20° C. or less. tan δ is expressed by the ratio of a loss modulus (E") to a storage modulus (E') (tan δ=E"/E'). In the case where a liquid crystal polymer having Ti of 20° C. or less is compounded in a rubber composition, since the vicinity of 0° C. is relatively close to Ti and 60° C. is away from Ti, E' sharply decreases as compared to E" at around 0° C., so that tan δ greatly increases. On the other hand, since the liquid crystal polymer is present in the isotropic phase at around 60° C., E" and E' both decrease gradually, so that the increase of tan δ is suppressed. As a result, the balance between the tan δ (0° C.) and the tan δ (60° C.) of the rubber composition can be improved at a higher level.

In the rubber composition, the liquid crystal polymer is preferably a liquid crystal elastomer. According to such a configuration, the balance between the tan δ (0° C.) and the tan δ (60° C.) of the rubber composition can be improved at a higher level.

In the rubber composition, the liquid crystal polymer is preferably a liquid crystal polyurethane elastomer. The liquid crystal polyurethane elastomer either may be a reaction product of a mesogenic group-containing compound having at least an active hydrogen group and an isocyanate compound, or may be a reaction product of a mesogenic group-containing compound having at least an active hydrogen group, an isocyanate compound, and a photopolymerizable group-containing compound. In these configurations, since the liquid crystal polyurethane elastomer exhibits high liquid crystallinity derived from the mesogenic group-containing compound and elasticity derived from the isocyanate compound, the liquid crystal polyurethane elastomer can improve the balance between the tan δ (0° C.) and the tan δ (60° C.) at a higher level when the liquid crystal polyurethane elastomer is compounded in a rubber composition.

In the above rubber composition, the liquid crystal polyurethane elastomer is preferably an emulsion-polymerized liquid crystal polyurethane elastomer or a suspension-polymerized liquid crystal polyurethane elastomer. According to these configurations, since the particle diameter of the polymer filler is controlled to be uniform and to be a desired particle diameter, the polymer filler can improve the balance between the tan δ (0° C.) and the tan δ (60° C.) at a higher level when the polymer filler is compounded in a rubber composition.

In the rubber composition, the loading of the polymer filler is preferably 1 to 50 parts by mass where the total amount of the diene rubber is 100 parts by mass. In this case, the tan δ (0° C.) of the rubber composition can be further increased, and the tan δ (60° C.) can be further reduced.

Furthermore, the present invention relates to a pneumatic tire having any one of the rubber compositions described above. As described above, the rubber composition according to the present invention is designed to have a large tan δ (0° C.) and a small tan δ (60° C.). For this reason, a pneumatic tire containing such a rubber composition, especially a pneumatic tire using such a rubber composition in a tread member, is improved in both WET performance and fuel efficiency in a well-balanced manner.

DETAILED DESCRIPTION OF THE PREFERRED EMBODIMENTS

The rubber composition according to the present invention comprises a diene rubber and a liquid crystal elastomer.

Further, the rubber composition according to the present invention may comprise a diene rubber and a polymer filler containing at least a liquid crystal polymer and having an average particle diameter of 500 μm or less.

As the rubber component, a rubber component that can be used as a raw material for a pneumatic tire can be arbitrarily used. In the present invention, a diene rubber can be suitably used. Examples of the diene rubber include natural rubber (NR), polyisoprene rubber (IR), polystyrene-butadiene rubber (SBR), polybutadiene rubber (BR), chloroprene rubber (CR), and nitrile rubber (NBR). If necessary, those modified at the terminal (for example, terminal-modified BR and terminal-modified SBR) or those modified to impart desired properties (for example, modified NR) can be suitably used. As to polybutadiene rubber (BR), in addition to those synthesized using a cobalt (Co) catalyst, a neodymium (Nd) catalyst, a nickel (Ni) catalyst, a titanium (Ti) catalyst, or a lithium (Li) catalyst, those synthesized using a polymerization catalyst composition comprising a metallocene complex disclosed in WO2007-129670 can also be used.

In consideration of fuel efficiency of pneumatic tires, polystyrene butadiene rubbers with a styrene content of 10 to 40% by mass, a vinyl bond amount of the butadiene moiety of 10 to 70% by mass, and a cis content of 10% by mass or more are preferable, and those with a styrene content of 15 to 25% by mass, a vinyl bond amount of the butadiene moiety of 10 to 60% by mass, and a cis content of 20% by mass or more are particularly preferable. When the rubber composition according to the present invention is used as a tread rubber part of a pneumatic tire, it is preferable to use a non-oil-extended polystyrene-butadiene rubber rather than an oil-extended polystyrene-butadiene rubber.

In the present invention, examples of the liquid crystal elastomer include a liquid crystal polyester elastomer, a liquid crystal polyacrylate elastomer, a liquid crystal polysiloxane elastomer, and a liquid crystal polyurethane elastomer. Among these, liquid crystal polyurethane elastomers are particularly preferable because when compounded in a rubber composition, the balance between tan δ (0° C.) and tan δ (60° C.) can be improved at a higher level.

In consideration of the dispersibility in a diene rubber, the average particle diameter of the liquid crystal elastomer (polymer filler) to be used in the present invention is preferably designed to be 500 μm or less. In consideration of the dispersibility of the liquid crystal elastomer in the diene rubber, the average particle diameter of the liquid crystal elastomer is more preferably 300 μm or less, and particularly preferably 100 μm or less. The lower limit of the average particle diameter of the liquid crystal elastomer is not particularly limited, but may be, for example, about 2 μm.

In the present invention, the average particle diameter of the polymer filler is an average particle diameter measured before compounding in the rubber composition, and even if a plurality of polymer fillers are aggregated at the compounding stage, a particle diameter measured before the aggregation is meant thereby. In the present invention, the polymer filler can be produced by various methods, and a method for measuring the average particle diameter of each polymer filler will be described later.

In the rubber composition according to the present invention, it is preferable, from the viewpoint of improving the balance between the tan δ (0° C.) and the tan δ (60° C.) of the rubber composition, to design the loading of the liquid crystal elastomer to be 1 to 50 parts by mass where the total amount of the diene rubber is 100 parts by mass. When the loading of a liquid crystal elastomer is less than 1 part by mass in a rubber composition, it is difficult to improve the WET performance and the fuel efficiency of a pneumatic tire as a final product in a well-balanced manner, and when the loading of the liquid crystal elastomer is greater than 50 parts by mass, the rubber properties may be impaired. In order to maintain the rubber properties of a pneumatic tire as a final product and concurrently improve the WET performance and the fuel efficiency in a well-balanced manner, the loading of the liquid crystal elastomer is preferably 3 to 50 parts by mass, and more preferably 5 to 20 parts by mass where the total amount of diene rubber is 100 parts by mass.

In the present invention, in order to improve the balance between the tan δ (0° C.) and the tan δ (60° C.) of the rubber composition at a higher level, the liquid crystal elastomer (liquid crystal polymer) preferably has a (liquid crystal phase)-to-(isotropic phase) transition temperature (Ti) of 20° C. or less, and more preferably 5° C. or less.

In the present invention, the liquid crystal elastomer preferably has a functional group capable of reacting with a diene rubber, and more preferably the functional group is a functional group containing at least a sulfur atom. Examples of the liquid crystal elastomer having a functional group containing at least a sulfur atom include a liquid crystal polyurethane elastomer described later which is a reaction product of a polysulfide-containing compound.

The liquid crystal polyurethane elastomer usable in the present invention either may be (i) a reaction product of a mesogenic group-containing compound having at least an active hydrogen group, an isocyanate compound, a polysulfide-containing compound, and a photopolymerizable group-containing compound, or may be (ii) a reaction product of a mesogenic group-containing compound having at least an active hydrogen group, an isocyanate compound, a polysulfide-containing compound, and a polyfunctional compound. Both the (i) and the (ii) mentioned above correspond to a liquid crystal polyurethane elastomer, which is a reaction product of a polysulfide-containing compound. Hereinafter, each configuration will be described.

As the mesogenic group-containing compound to be used in the above (i) and (ii), for example, compounds represented by the following general formula (1) can be used

[Formula 1]

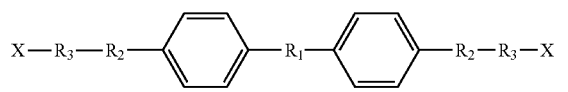

(1)

In the general formula (1), X is an active hydrogen group, $R_1$ is a single bond that forms a portion of binding groups adjacent thereto, —N=N—, —CO—, —CO—O—, or —CH=N—, $R_2$ is a single bond that forms a portion of binding groups adjacent thereto or —O—, and $R_3$ is a single bond that forms a portion of binding groups adjacent thereto or an alkylene group having 1 to 20 carbon atoms, provided that compounds where $R_2$ is —O— and $R_3$ is a single bond are excluded). Note that the term "single bond that forms a portion of binding groups adjacent thereto" means that the single bond is shared by the binding groups adjacent thereto. For example, in the case where $R_1$ in the general formula (1) is a single bond that forms a portion of binding groups adjacent thereto, the single bond $R_1$ is shared with the benzene rings on both sides, and forms a biphenyl structure together with the benzene rings on both sides. Examples of X include OH, SH, $NH_2$, COOH, and secondary amines. The loading of the mesogenic group-containing compound is adjusted to be 30 to 80% by mass, preferably 40 to 70% by mass in the whole raw materials of the liquid crystal polyurethane elastomer. If the loading of the mesogenic group-containing compound is less than 30% by mass, it is difficult for the resulting polymer to exhibit liquid crystallinity. If the loading of the mesogenic group-containing compound is greater than 80% by mass, the (liquid crystal phase)-to-(isotropic phase) transition temperature (Ti) is high and it is difficult to mold the polymer in a low temperature range including room temperature.

Preferably, the mesogenic group-containing compound is used in combination with an alkylene oxide and/or a styrene oxide. Since an alkylene oxide and/or a styrene oxide functions to lower the expression temperature of a liquid crystal phase in a liquid crystal polyurethane elastomer, a liquid crystal polyurethane elastomer produced by using an alkylene oxide and/or a styrene oxide in combination with a mesogenic group-containing compound can be easily designed to have a (liquid crystal phase)-to-(isotropic phase) transition temperature (Ti) falling within a desired temperature range. As the alkylene oxide, for example, ethylene oxide, propylene oxide, or butylene oxide can be used. The above-mentioned alkylene oxides may be used singly, or two or more of them may be used in combination. The styrene oxide may have a substituent such as an alkyl group, an alkoxy group, or halogen on the benzene ring thereof. As the alkylene oxide, a mixture of any of the above-mentioned alkylene oxides and any of the above-mentioned styrene oxides may be used. The loading amount of the alkylene oxide and/or the styrene oxide is adjusted such that 4 to 20 mol, preferably 6 to 15 mol of the alkylene oxide and/or the styrene oxide is added to 1 mol of the mesogenic group-containing compound.

As the isocyanate compound to be used in the above (i) and (ii), for example, the following diisocyanate compounds can be used. Examples of the diisocyanate compound include aromatic diisocyanates such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, 1,5-naphthalene diisocyanate.

p-phenylene diisocyanate, m-phenylene diisocyanate, p-xylylene diisocyanate, and m-xylylene diisocyanate; aliphatic diisocyanates such as ethylene diisocyanate, 1,5-pentamethylene diisocyanate, 2,2,4-trimethylhexamethylene-1,6-diisocyanate, 2,4,4-trimethylhexamethylene-1,6-diisocyanate, and 1,6-hexamethylene diisocyanate; and alicyclic diisocyanates such as 1,4-cyclohexane diisocyanate, 4,4'-dicyclohexylmethane diisocyanate, isophorone diisocyanate, and norbornane diisocyanate. The diisocyanate compounds mentioned as examples may be used singly, or two or more of them may be used in combination. In the present invention, a trifunctional or higher isocyanate compound may be used in combination as the isocyanate compound, but in order to eventually make the liquid crystal polyurethane elastomer be an emulsion-polymerized liquid crystal polyurethane elastomer or a suspension-polymerized liquid crystal polyurethane elastomer, the ratio of the diisocyanate compound is preferably 98% by mass or more, more preferably 99% by mass or more, and even more preferably approximately 100% by mass where the total amount of the isocyanate compounds to be used is 100% by mass. Examples of the trifunctional or higher isocyanate compound include triisocyanates such as triphenylmethane triisocyanate, tris(isocyanatephenyl) thiophosphate, lysine ester triisocyanate, 1,3,6-hexamethylene triisocyanate, 1,6,11-undecane triisocyanate, 1,8-diisocyanate-4-isocyanatomethyloctane, bicycloheptane triisocyanate, and tetraisocyanates such as tetraisocyanate silane.

When the total amount of the mesogenic group-containing compound constituting the liquid crystal polyurethane elastomer is 100 parts by mass, the ratio of the isocyanate compound is preferably 10 to 40 parts by mass, and more preferably 15 to 30 parts by mass. When the loading of the isocyanate compound is less than 10 parts by mass, the polymerization through a urethane reaction is insufficient. On the other hand, when the ratio of the isocyanate compound is greater than 40 parts by mass, the loading of the mesogenic group-containing compound in the whole raw materials of the liquid crystal polyurethane elastomer is relatively small, so that the liquid crystallinity of the liquid crystal polyurethane elastomer lowers.

The isocyanate group of the isocyanate compound can react with active hydrogen groups such as a hydroxyl group of a mesogenic group-containing compound, active hydroxyl groups such as a hydroxyl group of a polysulfide-containing compound, and active hydrogen groups such as a hydroxyl group of a photopolymerizable group-containing compound. An NCO INDEX (NCO/OH), which is the theoretical amount of the isocyanate groups of the isocyanate compound with respect to the theoretical amount of the active hydrogen groups of the mesogenic group-containing compound, the polysulfide-containing compound, and the photopolymerizable group-containing compound, is preferably 0.70 to 1.10, and more preferably 0.8 to 0.95. In the present invention, especially when the liquid crystal elastomer is composed of an emulsion-polymerized liquid crystal polyurethane elastomer or a suspension-polymerized liquid crystal polyurethane elastomer, it is preferable to design the NCO INDEX to fall within such a range because the molecular weight of the elastomer can be reduced.

Examples of the polysulfide-containing compound to be used in the above (i) and (ii) include a compound containing an active hydroxyl group such as a hydroxyl group and a polysulfide group. Specifically, examples thereof include bis(2-hydroxyethyl) disulfide, dithiodiglycolic acid, 3,3-dithiodipropionic acid, 4,4-dithionibutyric acid, 2,2-dithiodipropionic acid, bis(4-hydroxyphenyl) disulfide, bis(6-hydroxy-2-naphthyl) disulfide, 2,2-dithiodibenzoic acid, 6,6-dithiodinicotinic acid, 5,5-dithiobis(2-nitrobenzoic acid), 2,2-dithiodianiline, 4,4-dithiodianiline (R)-α-lipoic acid, xanthan hydride, 3-(2-pyridyldithio)propionic acid, cystamine dihydrochloride, formamidine disulfide dihydrochloride, cystine (DL-, meso-mixture), L-(−)-cystine, L-(−)-cystine dihydrochloride, L-cystine dimethyl dihydrochloride, DL-homocystine, bis[2-(4-azidosalicylamide)ethyl] disulfide, 2,2'-dithiobis(6-fluorobenzoic acid), lipoamido-PEG12-carboxylic acid, bis(2-benzamidophenyl) disulfide, N,N'-dibenzyloxycarboxy-L-cystine, and pyritinol.

When the total amount of the mesogenic group-containing compound constituting the liquid crystal polyurethane elastomer is 100 parts by mass, the ratio of the polysulfide-containing compound is preferably 0.01 to 30 parts by mass, and more preferably 0.01 to 20 parts by mass. When the loading of the polysulfide-containing compound is less than 0.01 parts by mass, the dispersibility of the liquid crystal polyurethane elastomer in the rubber composition deteriorates, and neither the rubber properties of the rubber composition nor the balance between tan δ (0° C.) and tan δ (60° C.) may be improved. On the other hand, when the ratio of the polysulfide-containing compound is greater than 30 parts by mass, the loading of the mesogenic group-containing compound in the whole raw materials of the liquid crystal polyurethane elastomer is relatively small, so that the liquid crystallinity of the liquid crystal polyurethane elastomer lowers.

As the photopolymerizable group-containing compound to be used in the above (i), for example, an acryloyl group-containing compound, a methacryloyl group-containing compound, and an allyl compound can be used. Examples of the acryloyl group-containing compound include propylene glycol diglycidyl ether-acrylic acid adduct, ethylene glycol diglycidyl ether-methacrylic acid adduct, tripropylene glycol diglycidyl ether-acrylic acid adduct, glycerin diglycidyl ether-acrylic acid adduct, bisphenol A-PO 2 mol adduct diglycidyl ether-acrylic acid adduct, 2-acryloyloxyethyl succinate, β-carboxyethyl acrylate, 2-hydroxyethyl acrylate, 2-hydroxypropyl acrylate, 2-hydroxybutyl acrylate, 2-hydroxy-3-phenoxypropyl acrylate, 2-acryloyloxyethyl-succinic acid, 2-acryloyloxyethyl-hexahydrophthalic acid, 2-acryloyloxyethyl-phthalic acid, 2-acryloyloxyethyl-2-hydroxyethyl-phthalic acid, 2-acryloyloxyethyl acid phosphate, 2-hydroxy-3-acryloyloxypropyl methacrylate, and pentaerythritol triacrylate. Examples of the methacryloyl group-containing compound include 2-hydroxyethyl methacrylate, 2-hydroxypropyl methacrylate, 2-hydroxybutyl methacrylate, 2-methacryloyloxyethyl-succinic acid, 2-methacryloyloxyethyl-hexahydrophthalic acid, 2-methacryloyloxyethyl acid phosphate, glycerin dimethacrylate, bisphenol A-PO 2 mol adduct diglycidyl ether-methacrylic acid adduct, bisphenol A diglycidyl ether-methacrylic acid adduct, 2-hydroxy-3-acryloyloxypropyl methacrylate, and 2-methacryloyloxyethyl succinate. Examples of the allyl group-containing compound include glycerin monoallyl ether, trimethylolpropane diallyl ether, and pentaerythritol triallyl ether.

When the total amount of the mesogenic group-containing compound constituting the liquid crystal polyurethane elastomer is 100 parts by mass, the ratio of the photopolymerizable group-containing compound is preferably 1 to 12 parts by mass, and more preferably 5 to 10 parts by mass. When the ratio of the photopolymerizable group-containing compound is out of the range described above, the balance between tan δ (0° C.) and tan δ (60° C.) may not be sufficiently improved in the case of being blended in a rubber composition.

In addition to the mesogenic group-containing compound having an active hydrogen group, the isocyanate compound, the polysulfide-containing compound, and the photopolymerizable group-containing compound to be used in the above (i) and (ii), an active hydrogen group-containing compound may be used as a raw material of a liquid crystal polyurethane elastomer. Examples of the active hydrogen group-containing compound include a polyol compound and an amine compound. Examples of the polyol compound include polyether polyol, polyester polyol, polycarbonate polyol, polyester polycarbonate polyol, ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethylene glycol, 1,4-bis(2-hydroxyethoxy)benzene, trimethylolpropane, glycerin, 1,2,6-hexanetriol, meso-erythritol, pentaerythritol, tetramethylolcyclohexane, methyl glucoside, sorbitol, mannitol, dulcitol, sucrose, 2,2,6,6-tetrakis(hydroxymethyl)cyclohexanol, diethanolamine, N-methyldiethanolamine, and triethanolamine. Examples of the amine compound include ethylenediamine, tolylenediamine, diphenylmethanediamine, diethylenetriamine, monoethanolamine, 2-(2-aminoethylamino)ethanol, and monopropanolamine. The above active hydrogen group-containing compounds each may be used singly, or two or more of them may be used in combination.

When reacting the mesogenic group-containing compound having an active hydrogen group, the isocyanate compound, the polysulfide-containing compound, and the photopolymerizable group-containing compound to be used in the above (i) and (ii), a urethane polymerization catalyst known to those skilled in the art may be used. Examples of such a polymerization catalyst include organotin catalysts such as dibutyltin dilaurate and tin octylate, tertiary amine catalysts such as triethylenediamine and derivatives thereof, N-methylmorpholine, N,N,N',N'-tetramethylethylenediamine, N,N,N',N'-tetramethylhexamethylenediamine, 1,8-diazabicyclo[5,4,0]undecene-7 (DBU), bis(N,N-dimethylamino-2-ethyl) ether, and bis(2-dimethylaminoethyl) ether, metal carboxylate catalysts such as potassium acetate and potassium octylate, and imidazole catalysts. Among these, the use of triethylenediamine and derivatives thereof is preferred.

In the above (i), the production conditions for producing the feedstock reaction product may include a method in which four components, namely, a mesogenic group-containing compound having at least an active hydrogen group, an isocyanate compound, a polysulfide-containing compound, and a photopolymerizable group-containing compound are heated and melted in a state where they are heated to 60 to 150° C., for example, and concurrently the four components are reacted with each other.

In the above (i), it is preferable, from the viewpoint of controlling the particle diameter to be uniform and desired, that the liquid crystal polyurethane elastomer be an emulsion-polymerized liquid crystal polyurethane elastomer or a suspension-polymerized liquid crystal polyurethane elastomer. As one example, an emulsion-polymerized liquid crystal polyurethane elastomer will be described below.

The emulsion-polymerized liquid crystal polyurethane elastomer can be produced by, for example, subjecting a reaction product (hereinafter also referred to as "feedstock reaction product") of a mesogenic group-containing compound having at least an active hydrogen group, an isocyanate compound, a polysulfide-containing compound, and a photopolymerizable group-containing compound to emulsion polymerization in the presence of a surfactant in water. When the feedstock reaction product is used as a raw material for an emulsion-polymerized liquid crystal polyurethane elastomer, the molecular weight thereof is preferably not so large, and for example, the molecular weight is preferably about 1,000 to about 20,000 in weight-average molecular weight.

As the surfactant, those commonly used for emulsion polymerization can be used, and any of anionic, nonionic and cationic surfactants can be used. The amount of the surfactant to be used in emulsion polymerization can be arbitrarily designed in order to adjust the average particle diameter of the liquid crystal elastomer to be produced to within a desired range and, for example, that amount may be designed such that the amount of the surfactant in water is 0.01 to 5% by mass.

When emulsion-polymerizing the feedstock reaction product in water in the presence of a surfactant, a polymerization initiator may be used. As the polymerization initiator, any of a photopolymerization initiator and a thermal polymerization initiator can be used. In the case of using a photopolymerization initiator, it is permissible from the viewpoint of productivity and uniform dispersion of the photopolymerization initiator to, when producing a feedstock reaction product, react the four components, namely, the mesogenic group-containing compound having at least an active hydrogen group, the isocyanate compound, the polysulfide-containing compound, and the photopolymerizable group-containing compound, with each other in the presence of the photopolymerization initiator, thereby producing a photopolymerizable initiator-containing feedstock reaction product, which is then irradiated with light having a wavelength of 200 to 600 nm in the presence of a surfactant in water, thereby producing an emulsion-polymerized liquid crystal polyurethane elastomer having a desired average particle diameter.

As the photopolymerization initiator, for example, 1 hydroxy-cyclohexyl-phenyl-ketone, bis(2,4,6-trimethylbenzoyl)-phenylphosphone oxide, 2,4,6-trimethylbenzoyl-diphenyl-phosphine oxide, 2,2-dimethoxy-1,2-diphenylethan-1-one, 2-hydroxy-2-methyl-1-phenyl-propan-1-one, 1-hydroxy-cyclohexyl-phenyl-ketone/benzophenone, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methyl-propan-1-one, oxy-phenyl-acetic acid 2-[2-oxo-2-phenyl-acetoxy-ethoxy]-ethyl ester/oxy-phenyl-acetic acid 2-[2-hydroxy-ethoxy]-ethyl ester, phenyl glyoxylic acid methyl ester, 2-methyl-1-[4-(methylthio)phenyl]-2-morpholinopropan-1-one, 2-benzyl-2-dimethyl-amino-1-(4-morpholinophenyl)-butanone-1,2-dimethyl-amino-2-(4-methyl-benzyl)-1-(4-morpholin-4-yl-phenyl)-butan-1-one, bis(η5-2,4-cyclopentadien-1-yl)-bis(2,6-difluoro-3-(1H-pyrrol-1-yl)-phenyl)titanium, 1,2-octanedione, 1-[4-(phenylthio)phenyl-,2-(O-benzoyloxime)], ethanone,1-[9-ethyl-6-(2-methylbenzoyl)-9H-carbazol-3-yl]-,1-(O-acetyloxime), iodonium, (4-methylphenyl)[4-(2-methylpropyl)phenyl]-hexafluoro-phosphate (1-)/propylene carbonate, triarylsulfonium hexafluorophosphate, triarylsulfonium tetrakis-(pentafluorophenyl)borate, and an oxime sulfonate photoacid generator may be used. The ratio of the photopolymerization initiator is preferably 0.1 to 10 parts by mass, and more preferably 0.1 to 8 parts by mass where the total amount of the mesogenic group-containing compound constituting the feedstock reaction product is 100 parts by mass. When the loading of the photopolymerization initiator is less than 0.1 part by mass, curing may be achieved insufficiently because a polymerization reaction does not proceed uniformly during light irradiation. When the loading of the photoreaction initiator is greater than 10 parts by mass, the content of mesogenic groups in a produced elastomer is reduced, so that liquid crystal phases may not be easily developed. The photoreaction initiator is preferably one having an absorption wavelength at between 200 and 600 nm. When the photoreaction initiator has an absorption wavelength in the above range, the photoreaction initiator absorbs light and a photocrosslinking reaction can be advanced securely even if the liquid crystal polyurethane elastomer or its raw materials are low in transparency (visible light transmittance).

The average particle diameter of the emulsion-polymerized liquid crystal polyurethane elastomer can be measured, for example, by measuring the average particle diameter of the emulsion polymerized liquid crystal polyurethane elastomer in a dispersed state in water by a laser diffraction method after emulsion polymerization. By the laser diffraction method, a particle diameter of about 0.03 to about 1000 μm can be measured. When the average particle diameter of a resulting emulsion-polymerized liquid crystal polyurethane elastomer is small, the average particle diameter can also be measured by a dynamic light scattering method (DLS). By DLS, a particle diameter of about 0.0014 to about 7 μm can be measured. When an emulsion-polymerized liquid crystal polyurethane elastomer is used as a raw material in the present invention, the average particle diameter measured by a laser diffraction method or DLS can be regarded as the average particle diameter measured before compounding in a rubber composition.

When a thermal polymerization initiator is used when emulsion-polymerizing a feedstock reaction product in water in the presence of a surfactant, it is possible to use one that can be emulsified in water or one that is previously mixed with the feedstock reaction product. As the thermal polymerization initiator, those known to those skilled in the art can be used.

The suspension-polymerized liquid crystal polyurethane elastomer can be produced by subjecting a feedstock reaction product and water to suspension polymerization with mechanical stirring. During the suspension polymerization, a surfactant and/or a polymerization initiator may be used as necessary, and examples thereof include those usable in emulsion polymerization. The average particle diameter of the suspension-polymerized liquid crystal polyurethane elastomer can be determined by the same method as that for the emulsion-polymerized liquid crystal polyurethane elastomer.

The polyfunctional compound to be used in the above (ii) may be a compound having three or more functional groups capable of reacting with an active hydrogen group or an isocyanate group. Specifically, examples thereof include triols such as glycerin and trimethylolpropane; tetraols such as pentaerythritol; diamines such as ethylenediamine, hexamethylenediamine, 4,4'-diaminodiphenylmethane, m-phenylenediamine, and 3,3'-dichloro-4,4'-diaminodiphenylmethane (MOCA); aminoalcohols such as diethanolamine, triethanolamine, and aminoethylethanolamine; and the above-mentioned trifunctional or higher isocyanate compounds.

In the rubber composition according to the present invention, various compounding ingredients such as carbon black, silica, a silane coupling agent, an anti-aging agent, zinc oxide, stearic acid, softening agents such as wax and oil, and a processing aid may be compounded in addition to the rubber component and the liquid crystal elastomer.

As the carbon black, for example, conductive carbon black such as acetylene black and Ketjen black as well as carbon black to be used in the ordinary rubber industry such as SAF, ISAF, HAF, FEF, and GPF can be used.

As the silica, wet silica and dry silica can be used, and it is particularly preferable to use wet silica mainly containing hydrous silicic acid.

As the silane coupling agent, a silane coupling agent having a reaction activity to a diene rubber is used. Examples of the silane coupling agent usable in the present invention include sulfide silanes such as bis(3-triethoxysilylpropyl)tetrasulfide (for example, "Si69" manufactured by Degussa), bis(3-triethoxysilylpropyl)disulfide (for example, "Si75" manufactured by Degussa), bis(2-triethoxysilylethyl)tetrasulfide, bis(4-triethoxysilylbutyl)disulfide, bis(3-trimethoxysilylpropyl)tetrasulfide, and bis(2-trimethoxysilylethyl)disulfide, mercaptosilanes such as γ-mercaptopropyltrimethoxysilane, γ-mercaptopropyltriethoxysilane, mercaptopropylmethyldimethoxysilane, mercaptopropyldimethylmethoxysilane, and mercaptoethyltriethoxysilane, and protected mercaptosilanes such as 3-octanoylthio-1-propyltriethoxysilane and 3-propionylthiopropyltrimethoxysilane.

As the anti-aging agent, antioxidants that are commonly used for rubbers such as aromatic amine anti-aging agents, amine-ketone anti-aging agents, monophenol anti-aging agents, bisphenol anti-aging agents, polyphenol anti-aging agents, dithiocarbamic acid salt antioxidants, and thiourea antioxidants may be used singly or as an appropriate mixture.

After the step of mixing compounding ingredients other than compounding ingredients for vulcanization, a compounding ingredient for vulcanization is further mixed and dispersed. Examples of the compounding ingredient for vulcanization to be used in the step of mixing the compounding ingredient for vulcanization include a vulcanizing agent such as sulfur and organic peroxides, a vulcanization accelerator, a vulcanization accelerating aid, and a vulcanization retarder.

The sulfur as the sulfur-based vulcanizing agent may be any ordinary sulfur for rubber, and for example, powdered sulfur, precipitated sulfur, insoluble sulfur, and highly dispersible sulfur can be used.

As the vulcanization accelerator, vulcanization accelerators commonly used for rubber vulcanization, such as sulfenamide-based vulcanization accelerators, thiuram-based vulcanization accelerators, thiazole-based vulcanization accelerators, thiourea-based vulcanization accelerators, guanidine-based vulcanization accelerators, and dithiocarbamate-based vulcanization accelerators may be used singly or as an appropriate mixture.

The rubber composition according to the present invention is obtained by kneading a rubber component, a liquid crystal elastomer and, if necessary, carbon black, silica, a silane coupling agent, a compounding ingredient for vulcanization, an anti-aging agent, zinc oxide, stearic acid, wax, a softening agent such as oil, a processing aid, etc. by using a kneading machine to be used in the common rubber industry, such as a Banbury mixer, a kneader, or a roll.

The method of compounding the above components described above is not particularly limited, and any of a method of kneading a sulfur-based vulcanizing agent and compounding components other than compounding ingredients for vulcanization such as a vulcanization accelerator in advance to form a master batch, and then adding the remaining ingredients and further kneading them, a method of adding the ingredients in an arbitrary order and kneading them, and a method of adding all ingredients simultaneously and kneading them may be used.

In the present invention, a vulcanized rubber in which a liquid crystal elastomer is dispersed in a diene rubber can be produced by mixing a diene rubber and a liquid crystal elastomer, preferably mixing a diene rubber and a liquid crystal elastomer having a functional group capable of reacting with the diene rubber, more preferably mixing a diene rubber and a liquid crystal polyurethane elastomer which is a reaction product of a polysulfide-containing compound capable of reacting with the diene rubber, and then vulcanizing the resulting rubber composition. Since such a vulcanized rubber has a structure in which a diene rubber and a liquid crystal elastomer are chemically reacted, the vulcanized rubber has well-balanced tan δ (0° C.) and tan δ (60° C.) and also is superior in rubber properties. Therefore, it is particularly useful, for example, as a tread member of a pneumatic tire.

EXAMPLES

Hereinafter, examples and the like that specifically show the configuration and effects of the present invention will be described. The evaluation items in Examples and the like were measured as follows.

<Transition Temperature (Ti)>

The transition temperatures (Ti) of the feedstock reaction products 1 to 6 and the liquid crystal polyurethane fillers 1 to 8 were measured using a differential scanning calorimeter [DSC] (product name: X-DSC7000, manufactured by Hitachi High-Tech Science Corporation).

<Average Particle Diameter of Liquid Crystal Polyurethane Fillers 1 to 2>

The particle diameter after freeze-pulverization was calculated through image analysis (acceleration voltage: 15 kV) using a scanning electron microscope (product name: SU3500, manufactured by Hitachi High-Technologies Corporation).

<Average Particle Diameter of Liquid Crystal Polyurethane Fillers 3 to 8>

The average particle diameter of each of the liquid crystal polyurethane fillers 3 to 8 (emulsion-polymerized liquid crystal polyurethane elastomers) was determined by measuring the average particle diameter of an emulsion-polymerized liquid crystal polyurethane elastomer dispersed in water after emulsion polymerization by using a laser diffraction particle size distribution analyzer (product name: "SALD-2200", manufactured by Shimadzu Corporation) using a laser diffraction method.

<Dynamic Viscoelasticity Measurement>

The rubber compositions of Examples 1 to 8 and the rubber composition of Comparative Example 1 were vulcanized by heating at 160° C. for 20 minutes, and were molded into a prescribed shape, thereby forming measurement samples. For each of the measurement samples, a storage modulus (E') and a loss modulus (E") were measured by using a dynamic viscoelasticity measuring device (product name: "Automatic Viscoelasticity Analyzer VR-7110", manufactured by Ueshima Seisakusho Co., Ltd.), and then a tan δ (0° C.) and a tan δ (60° C.) were determined. In Table 3, the results are indicated by indices with the tan δ of Comparative Example 1 being set to 100. The measurement conditions are as follows.

Size of measured sample: length 40 mm, width 3 mm, thickness 2 mm
Measurement mode: Tension mode
Measurement temperature: 0° C., 60° C.
Frequency: 100 Hz
Dynamic distortion: 0.15%

<Measurement of Elongation at Break and Breaking Strength>

The rubber compositions of Examples 1 to 8 and the rubber composition of Comparative Example 1 were vulcanized by heating at 160° C. for 20 minutes, and were molded into a 2 mm-thick dumbbell-shaped No. 3 specimen in accordance with JIS K 6251, thereby forming measurement samples. For each of the obtained measurement samples, breaking strength and elongation at break were measured using a tensile tester (precision universal testing machine, AUTOGRAPH AG-X manufactured by Shimadzu Corporation). The measured values are shown in Table 3.

(Production of Mesogenic Diol A)

BH6 (500 g) as a mesogenic group-containing compound having an active hydrogen group, potassium hydroxide (19 g), and N,N-dimethyl formamide (3000 ml) as a solvent were put into a reaction vessel and then mixed, and 8.8 equivalents of propylene oxide as an alkylene oxide was added with respect to 1 mol of BH6. The resultant mixture was caused to undergo a reaction under applied pressure at 120° C. for 2 hours (addition reaction). Next, oxalic acid (15 g) was added to the reaction vessel to stop the addition reaction. Insoluble salts were removed from the reaction liquid by suction filtration. In addition, N,N-dimethyl formamide was removed from the reaction liquid by distillation under reduced pressure. Thus, mesogenic diol A was obtained. The hydroxyl value of the mesogenic diol A is 141. The synthesis scheme of the mesogenic diol A is shown in formula (2). The mesogenic diol A shown in formula (2) is a typical one, and various structural isomers may be included. n* in formula (2) is 4.4 on average.

[Formula 2]

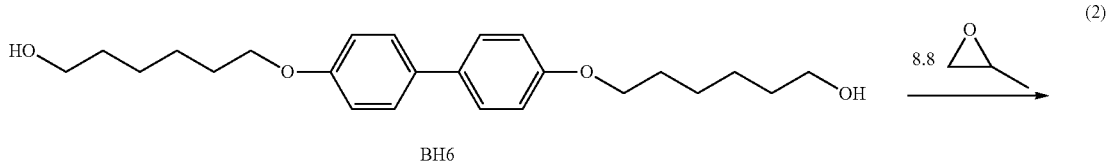

BH6

(2)

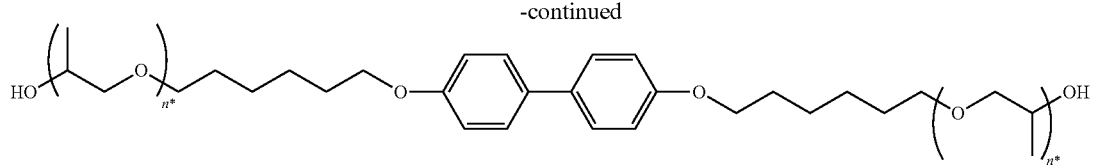

Mesogenic diol A (Production of Feedstock Reaction Products 1 to 6)

Feedstock reaction products 1 to 6 were produced by compounding 1,6-hexamethylene diisocyanate (manufactured by Tokyo Chemical Industry Co., Ltd.) as an isocyanate compound, 2-hydroxyethyl acrylate (manufactured by Kyoeisha Chemical Co., Ltd.) as a photopolymerizable group-containing compound, 2,4,6-trimethylbenzoyl-diphenyl-phosphine oxide (TPO) (manufactured by IGM resins) as a photoreaction initiator, 3,3-dithiodipropionic acid (manufactured by Tokyo Chemical Industry Co., Ltd.), bis(2-hydroxyethyl) disulfide (manufactured by Tokyo Chemical Industry Co., Ltd.), or 4,4-dithiodianiline (manufactured by Tokyo Chemical Industry Co., Ltd.) as a polysulfide-containing compound in the compounding ratio shown in Table 1 with 100 parts by mass of the mesogenic diol A, and mixing them at 80° C. with stirring.

(Production of Liquid Crystal Polyurethane Fillers 1 to 2)

Compounded at the compounding ratio described in Table 1, mixed at 80° C. with stirring, after cooling the resulting reaction product with liquid nitrogen, a pulverizer (Fritsch Co. rotor speed mill P-14) was used, and liquid crystal polyurethane fillers 1 and 2 were produced by freeze-pulverization under the following conditions.

Rotor speed [rpm] 15000
Sieve ring hole size [mm] 0.5
Number of impact rotor blades [sheets] 12

TABLE 1

| | | | Liquid crystal polyurethane filler 1 | Liquid crystal polyurethane filler 2 | Feedstock reaction product 1 | Feedstock reaction product 2 | Feedstock reaction product 3 | Feedstock reaction product 4 | Feedstock reaction product 5 | Feedstock reaction product 6 |
|---|---|---|---|---|---|---|---|---|---|---|
| Raw material (parts by mass) | Active hydrogen group-containing compound | Mesogenic diol A | 100 | 100 | 100 | 100 | 100 | 100 | 100 | 100 |
| | | 2-Hydroxyethyl acrylate | | | 9 | 9 | 9 | 9 | 9 | 9 |
| | | TMP | 2 | 3 | | | | | | |
| | Polysulfide compound | 3,3'-Dithiodipropionic acid | | 10 | | 5 | 10 | 20 | | |
| | | Bis(2-hydroxyethyl) disulfide | | | | | | | 10 | |
| | | 4,4'-Dithiodianiline | | | | | | | | 10 |
| | Photo initiator | 2,4,6-Trimethylbenzoyl-diphenyl-phosphine oxide | 0 | 0 | 1.3 | 1.4 | 1.5 | 1.6 | 1.5 | 1.5 |
| | Isocyanate | 1,6-Hexamethylene diisocyanate | 24 | 33 | 23 | 26 | 30 | 37 | 33 | 29 |
| Physical properties | Transition temperature (Ti) [° C.] | | −2.1 | −1.9 | −2.2 | −2.0 | −1.9 | −1.7 | −1.8 | −1.8 |
| | Average particle diameter [μm] (for only freeze-pulverized products) | | 234 | 245 | — | — | — | — | — | — |

(Production of Liquid Crystal Polyurethane Fillers 3 to 8)

Liquid crystal polyurethane fillers 3 to 8 (emulsion-polymerized liquid crystal polyurethane elastomers) were produced by compounding the feedstock reaction products 1 to 6, surfactant, and water in a prescribed ratio, and irradiating them with light having a wavelength of 200 to 600 nm (irradiation energy: 800 mJ) by using a desktop UV curing device (product name: EYE Mini-Grantage (ESC-1511U), manufactured by Eye Graphics Co., Ltd.). After the emulsion polymerization, the average particle diameter of the emulsion-polymerized liquid crystal polyurethane elastomer in a dispersed state in water was measured by the above method, dried at 110° C. for 10 hours, and further dried at 110° C. in vacuo, and the resulting product was compounded in a rubber composition described below.

TABLE 2

|  |  |  | Product number | Liquid crystal polyurethane filler 3 | Liquid crystal polyurethane filler 4 | Liquid crystal polyurethane filler 5 | Liquid crystal polyurethane filler 6 | Liquid crystal polyurethane filler 7 | Liquid crystal polyurethane filler 8 |
|---|---|---|---|---|---|---|---|---|---|
| Formulation (parts by mass) | Liquid crystal polyurethane elastomer | Feedstock reaction product 1 | — | 20 |  |  |  |  |  |
|  |  | Feedstock reaction product 2 | — |  | 20 |  |  |  |  |
|  |  | Feedstock reaction product 3 | — |  |  | 20 |  |  |  |
|  |  | Feedstock reaction product 4 | — |  |  |  | 20 |  |  |
|  |  | Feedstock reaction product 5 | — |  |  |  |  | 20 |  |
|  |  | Feedstock reaction product 6 | — |  |  |  |  |  | 20 |
|  | Surfactant | Polyoxyethylene polycyclic phenyl ether ⌬-O—(CH$_2$CH$_2$O)$_n$—H (⌬: polycyclic phenyl group) | Newcol 740 (60) | 0.133 | 0.133 | 0.133 | 0.133 | 0.133 | 0.133 |
|  | Distilled water |  |  | 80 | 80 | 80 | 80 | 80 | 80 |
| Added amount of surfactant | Surfactant [g]/(surfactant + distilled water [g])*100 |  |  | 0.1 | 0.1 | 0.1 | 0.1 | 0.1 | 0.1 |
| Added amount of liquid crystal polymer | Liquid crystal polymer [g]/(liquid crystal polymer + surfactant + distilled water [g])*100 |  |  | 20 | 20 | 20 | 20 | 20 | 20 |
| Physical properties | Ti [° C.] |  |  | −1.9 | −1.8 | −1.5 | −1.3 | −1.4 | −1.6 |
|  | Average particle diameter [μm] |  |  | 3.2 | 3.0 | 2.3 | 1.9 | 1.8 | 2.0 |

(Production of Rubber Compositions of Examples 1 to 8)

The obtained liquid crystal polyurethane fillers 1 to 8 were compounded with a diene rubber (SBR, trade name: SL563, manufactured by JSR Corporation) using a laboratory mixer (product name: LABO PLASTOMILL, manufactured by Toyo Seiki Seisaku-sho, Ltd.). The compounding procedure was carried out at the compounding ratios shown in Table 3 and, as a first step, silica (trade name: NIPSIL AQ, manufactured by Tosoh Silica Corporation), a silane coupling agent (bis(3-triethoxysilylpropyl)tetrasulfide, trade name: Si69, manufactured by Evonik Degussa Corporation), zinc flower (trade name: Zinc Flower #1, manufactured by Mitsui Mining & Smelting Co., Ltd.), stearic acid (trade name: LUNAC S-20, manufactured by Kao Corporation), and an anti-aging agent (trade name: NOCRAC 6C, manufactured by Ouchi Shinko Chemical Industrial Co., Ltd.) were added to SBR and kneaded at 160° C., and then, as a second step, a liquid crystal polyurethane filler was added to the kneaded product and kneaded at 160° C., and as a third step, the kneaded product is added with sulfur (150 mesh powdered sulfur for rubber, manufactured by Hosoi Chemical Industry Co., Ltd.) and vulcanization accelerators (trade name: NOCCELER CZ (primary vulcanization accelerator) and NOCCELER D (secondary vulcanization accelerator), both manufactured by Ouchi Shinko Chemical Co., Ltd.) were added to the kneaded product and kneaded at 90° C., and the resultants were taken as the rubber compositions of Examples 1 to 8. In the remarks in Table 3, "pulverized" means that the compounded liquid crystal polyurethane filler is a "freeze-pulverized product". "Emulsification" means that the compounded liquid crystal polyurethane filler is an "emulsion-polymerized product". For example, "S—S 5phr" means "the parts by mass of the polysulfide-containing compound with respect to 100 parts by mass of the mesogenic diol A in the feedstock reaction product".

TABLE 3

|  |  | Remarks | Liquid crystal material free | Pulverization S—S 0 phr | Pulverization S—S 10 phr | Emulsification S—S 0 phr | Emulsification S—S 5 phr | Emulsification S—S 10 phr | Emulsification S—S 20 phr | Emulsification S—S 10 phr | Emulsification S—S 10 phr |
|---|---|---|---|---|---|---|---|---|---|---|---|
| Formulation (parts by weight) | SBR |  | 100 | 100 | 100 | 100 | 100 | 100 | 100 | 100 | 100 |
|  | Silica |  | 50 | 50 | 50 | 50 | 50 | 50 | 50 | 50 | 50 |
|  | Silane coupling agent |  | 4 | 4 | 4 | 4 | 4 | 4 | 4 | 4 | 4 |
|  | Liquid crystal polyurethane filler 1 |  |  | 20 |  |  |  |  |  |  |  |
|  | Liquid crystal polyurethane filler 2 |  |  |  | 20 |  |  |  |  |  |  |
|  | Liquid crystal polyurethane filler 3 |  |  |  |  | 20 |  |  |  |  |  |
|  | Liquid crystal polyurethane filler 4 |  |  |  |  |  | 20 |  |  |  |  |
|  | Liquid crystal polyurethane filler 5 |  |  |  |  |  |  | 20 |  |  |  |

TABLE 3-continued

|  | Liquid crystal material free | Pulverization S—S 0 phr | Pulverization S—S 10 phr | Emulsification S—S 0 phr | Emulsification S—S 5 phr | Emulsification S—S 10 phr | Emulsification S—S 20 phr | Emulsification S—S 10 phr | Emulsification S—S 10 phr |
|---|---|---|---|---|---|---|---|---|---|
| Liquid crystal polyurethane filler 6 |  |  |  |  |  |  | 20 |  |  |
| Liquid crystal polyurethane filler 7 |  |  |  |  |  |  |  | 20 |  |
| Liquid crystal polyurethane filler 8 |  |  |  |  |  |  |  |  | 20 |
| Zinc flower | 2 | 2 | 2 | 2 | 2 | 2 | 2 | 2 | 2 |
| Stearic acid | 2 | 2 | 2 | 2 | 2 | 2 | 2 | 2 | 2 |
| Anti-aging agent | 2 | 2 | 2 | 2 | 2 | 2 | 2 | 2 | 2 |
| Sulfur | 1.4 | 1.4 | 1.4 | 1.4 | 1.4 | 1.4 | 1.4 | 1.4 | 1.4 |
| Vulcanization accelerator | 0.95 | 0.95 | 0.95 | 0.95 | 0.95 | 0.95 | 0.95 | 0.95 | 0.95 |
| Secondary vulcanization accelerator | 0.95 | 0.95 | 0.95 | 0.95 | 0.95 | 0.95 | 0.95 | 0.95 | 0.95 |
| Physical properties tanδ(0° C.) | 100 | 112 | 112 | 114 | 115 | 119 | 115 | 118 | 117 |
| tanδ(60° C.) | 100 | 100 | 99 | 98 | 98 | 97 | 96 | 97 | 98 |
| Elongation at break [%] | 667 | 579 | 649 | 596 | 631 | 666 | 672 | 660 | 654 |
| Breaking strength [MPa] | 26 | 14 | 17 | 18 | 22 | 23 | 25 | 22 | 21 |

The results in Table 3 show that the vulcanized rubbers of the rubber compositions according to Examples 1 to 8 maintain the hardness, and the tan δ (0° C.) is greatly increased, but the increase of the tan δ (60° C.) is suppressed and the balance between the tan δ (0° C.) and the tan δ (60° C.) is improved.

Hereinafter, other examples and the like that specifically show the configuration and effects of the present invention will be described. The evaluation items in Examples and the like were measured as follows.

<Transition Temperature (Ti)>

The transition temperatures (Ti) of the feedstock reaction products 11 to 13 and the polymer fillers 11 to 17 were measured using a differential scanning calorimeter [DSC] (product name: X-DSC7000, manufactured by Hitachi High-Tech Science Corporation).

<Average Particle Diameter of Polymer Filler (Emulsion-Polymerized Liquid Crystal Polyurethane Elastomer)>

The average particle diameter of the polymer filler containing the emulsion-polymerized liquid crystal polyurethane elastomer is determined by measuring the average particle diameter of the emulsion-polymerized liquid crystal polyurethane elastomer dispersed in water after emulsion polymerization by using a laser diffraction particle size distribution analyzer (product name: "SALD-2200", manufactured by Shimadzu Corporation) using a laser diffraction method.

<Dynamic Viscoelasticity Measurement>

The rubber compositions of Examples 11 to 18 and the rubber composition of Comparative Example 11 were vulcanized by heating at 160° C. for 20 minutes, and were molded into a prescribed shape, thereby forming measurement samples. For each of the measurement samples, a storage modulus (E') and a loss modulus (E") were measured by using a dynamic viscoelasticity measuring device (product name: "Automatic Viscoelasticity Analyzer VR-7110", manufactured by Ueshima Seisakusho Co., Ltd.), and then a tan δ (0° C.) and a tan δ (60° C.) were determined. In Table 6, the results are indicated by indices with the tan δ of Comparative Example 11 being set to 100. The measurement conditions are as follows.

Size of measured sample: length 40 mm, width 3 mm, thickness 2 mm

Measurement mode: Tension mode

Measurement temperature: 0° C., 60° C.

Frequency: 100 Hz

Dynamic distortion: 0.15%

<Hardness Measurement>

The rubber compositions of Examples 11 to 18 and the rubber composition of Comparative Example 11 were vulcanized by heating at 160° C. for 20 minutes, and were molded into a prescribed shape, thereby forming measurement samples. For each of the obtained measurement samples, hardness at 23° C. (in accordance with JIS K6253) was measured with a durometer type A (model: GS-719N, manufactured by TECLOCK Corporation). In Table 6, the results are indicated by indices with the value of the hardness of Comparative Example 11 being set to 100.

(Production of Mesogenic Diol A)

BH6 (500 g) as a mesogenic group-containing compound having an active hydrogen group, potassium hydroxide (19 g), and N,N-dimethyl formamide (3000 ml) as a solvent were put into a reaction vessel and then mixed, and 8.8 equivalents of propylene oxide as an alkylene oxide was added with respect to 1 mol of BH6. The resultant mixture was caused to undergo a reaction under applied pressure at 120° C. for 2 hours (addition reaction). Next, oxalic acid (15 g) was added to the reaction vessel to stop the addition reaction. Insoluble salts were removed from the reaction liquid by suction filtration. In addition, N,N-dimethyl formamide was removed from the reaction liquid by distillation under reduced pressure. Thus, mesogenic diol A was obtained. The hydroxyl value of the mesogenic diol A is 141. The synthesis scheme of the mesogenic diol A is shown in formula (2). The mesogenic diol A shown in formula (2) is a typical one, and various structural isomers may be included. n* in formula (2) is 4.4 on average.

[Formula 3]

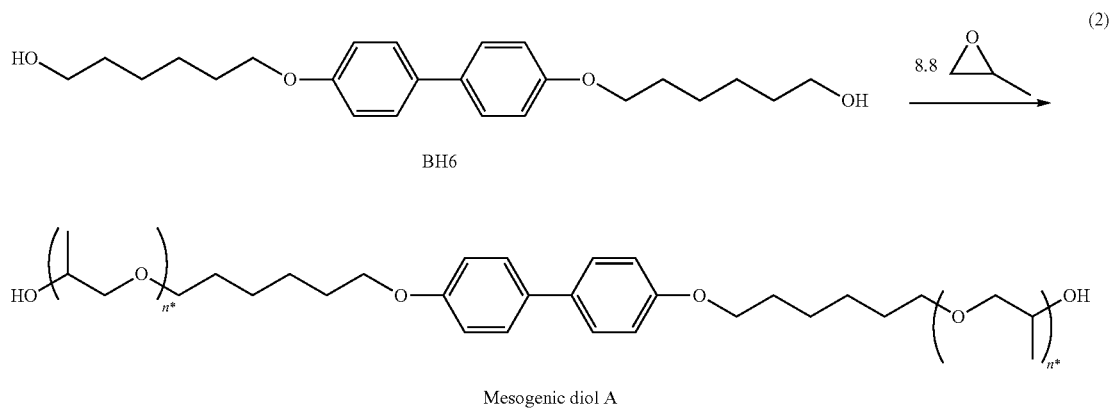

(Production of Mesogenic Diol B)

BHBA6 (500 g) as a mesogenic group-containing compound having an active hydrogen group, potassium hydroxide (19 g), and N,N-dimethyl formamide (3000 ml) as a solvent were put into a reaction vessel and then mixed, and 8.4 equivalents of propylene oxide as an alkylene oxide was added with respect to 1 mol of BHBA6. The resultant mixture was caused to undergo a reaction under applied pressure at 120° C. for 2 hours (addition reaction). Next, oxalic acid (15 g) was added to the reaction vessel to stop the addition reaction. Insoluble salts were removed from the reaction liquid by suction filtration. In addition, N,N-dimethyl formamide was removed from the reaction liquid by distillation under reduced pressure. Thus, mesogenic diol B was obtained. The hydroxyl value of the mesogenic diol B is 137. The synthesis scheme of the mesogenic diol B is shown in formula (3). The mesogenic diol B shown in formula (3) is a typical one, and various structural isomers may be included. n* in formula (3) is 4.2 on average.

[Formula 4]

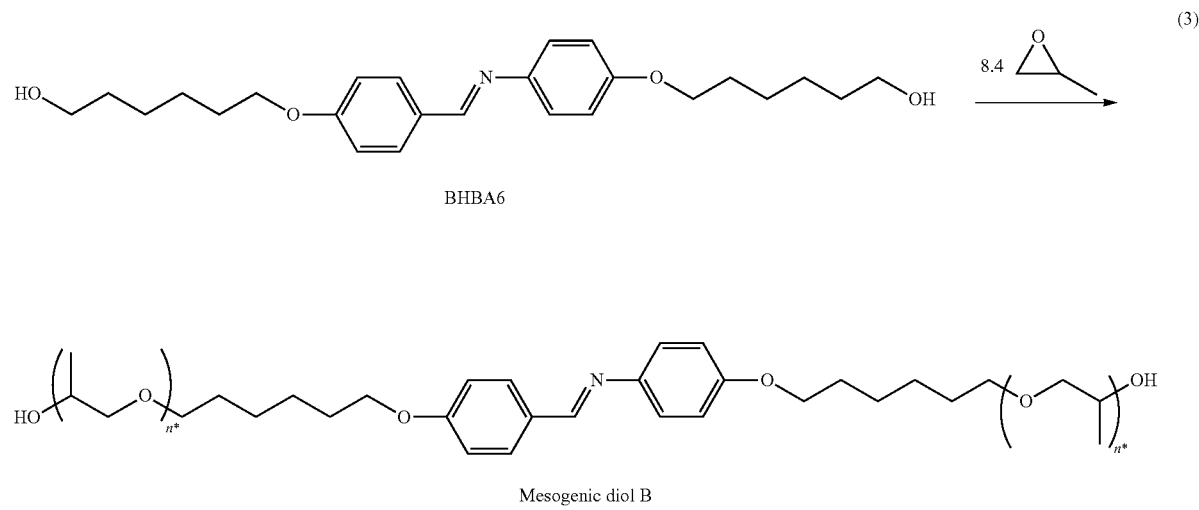

(Production of Feedstock Reaction Products 11-13)

Feedstock reaction products 11 to 13 were produced by compounding 1,6-hexamethylene diisocyanate (manufactured by Tokyo Chemical Industry Co., Ltd.) as an isocyanate compound, 2-hydroxyethyl acrylate (manufactured by Kyoeisha Chemical Co., Ltd.) as a photopolymerizable group-containing compound, and 2,4,6-trimethylbenzoyl-diphenyl-phosphine oxide (TPO) (manufactured by IGM resins) as a photoreaction initiator in the compounding ratio shown in Table 4 with 100 parts by mass of mesogenic diol A or mesogenic diol B, and mixing them at 80° C. with stirring.

TABLE 4

|  |  |  | Feedstock reaction product 11 | Feedstock reaction product 12 | Feedstock reaction product 13 |
|---|---|---|---|---|---|
| Raw material (parts by mass) | Mesogenic group-containing compound | Mesogenic diol A<br>Mesogenic diol B | 100 | 100 | 100 |
|  | Photopolymerizable group-containing compound | 2-Hydroxyethyl acrylate | 12 | 9 | 9 |
|  | Photopolymerization initiator | 2,4,6-Trimethylbenzoyl-diphenyl-phosphine oxide | 1.35 | 1.33 | 1.33 |
|  | Isocyanate compound | 1,6-Hexamethylene diisocyanate | 22 | 23 | 23 |
| Physical properties | Transition temperature (Ti) [° C.] |  | 0.8 | −0.5 | 0.9 |

(Production of Polymer Fillers 11 to 17)

The feedstock reaction products 11 to 13, each surfactant, and water were compounded in prescribed ratios, and the resulting mixtures were irradiated with light having a wavelength of 200 600 nm (irradiation energy: 800 mJ) by using a desktop UV curing device (product name: EYE Mini-Grantage (ESC-1511U), manufactured by Eye Graphics Co., Ltd.), and thus polymer fillers 11 to 17 containing emulsion-polymerized liquid crystal polyurethane elastomers were produced. After the emulsion polymerization, the average particle diameter of the emulsion-polymerized liquid crystal polyurethane elastomer in a dispersed state in water was measured by the above method, dried at 110° C. for 10 hours, and further dried at 110° C. in vacuo, and the resulting product was compounded in a rubber composition described below.

TABLE 5

|  |  |  | Product number | Polymer filler 11 | Polymer filler 12 | Polymer filler 13 | Polymer filler 14 | Polymer filler 15 | Polymer filler 16 | Polymer filler 17 |
|---|---|---|---|---|---|---|---|---|---|---|
| Formulation (parts by mass) | Liquid crystal polyurethane elastomer | Feedstock reaction product 11 | — |  | 20 |  |  |  |  |  |
|  |  | Feedstock reaction product 12 | — |  |  | 20 | 20 | 20 | 20 | 20 |
|  |  | Feedstock reaction product 13 | — |  |  |  |  |  |  | 20 |
|  | Surfactant | Polyoxyethylene polycyclic phenyl ether ⌬-O—(CH$_2$CH$_2$O)$_n$—H (⌬: polycyclic phenyl group) | Newcol 714 (80) |  | 0.1 |  |  |  |  |  |
|  |  |  | Newcol 723 (60) |  |  | 0.133 |  |  |  |  |
|  |  |  | Newcol 740 (60) | 0.133 |  |  | 0.133 |  |  | 0.133 |
|  |  | Polyoxyethylene alkyl ether R—O—(CH$_2$CH$_2$O)$_n$—H (R—OH: C12C13 synthetic alcohol) | Newcol 2360 |  |  |  |  |  | 0.08 |  |
|  |  | Polyoxyethylene Polycyclic phenyl ether sulfate ⌬-O—(CH$_2$CH$_2$O)$_n$—SO$_3$X (⌬: polycyclic phenyl group, X: Na, NH$_4$) | Newcol 723-SF |  |  |  |  |  | 0.08 |  |
|  |  | Distilled water |  | 80 | 80 | 80 | 80 | 80 | 80 | 80 |
| Surfactant Added amount | Surfactant [g]/(surfactant + distilled water [g])*100 |  |  | 0.1 | 0.1 | 0.1 | 0.1 | 0.1 | 0.1 | 0.1 |
| Liquid crystal polymer Added amount | Liquid crystal polymer [g]/(liquid crystal polymer + surfactant + distilled water [g])*100 |  |  | 20 | 20 | 20 | 20 | 20 | 20 | 20 |
| Physical properties | Ti [° C.] |  |  | 0.1 | −0.1 | 0.3 | 0.4 | 0.3 | 0.2 | 0.1 |
|  | Average particle diameter [μm] |  |  | 5 | 10 | 6 | 1 | 474 | 2 | 1 |

(Production of Rubber Compositions of Examples 11 to 18 and Comparative Example 11)

The obtained polymer fillers 11 to 17 were compounded with a diene rubber (SBR, trade name: SL563, manufactured by JSR Corporation) using a laboratory mixer (product name: LABO PLASTOMILL, manufactured by Toyo Seiki Seisaku-sho, Ltd.). The compounding procedure was carried out at the compounding ratios shown in Table 4 and, as a first step, silica (trade name: NIPSIL AQ, manufactured by Tosoh Silica Corporation), a silane coupling agent (bis(3-triethoxysilylpropyl)tetrasulfide, trade name: Si69, manufactured by Evonik Degussa Corporation), zinc flower (trade name: Zinc Flower #1, manufactured by Mitsui Mining & Smelting Co., Ltd.), stearic acid (trade name: LUNAC S-20, manufactured by Kao Corporation), and an anti-aging agent (trade name: NOCRAC 6C, manufactured by Ouchi Shinko Chemical Industrial Co., Ltd.) were added to SBR and kneaded at 160° C., and then, as a second step, a polymer filler was added to the kneaded product and kneaded at 160° C., and as a third step, the kneaded product is added with sulfur (150 mesh powdered sulfur for rubber, manufactured by Hosoi Chemical Industry Co., Ltd.) and vulcanization accelerators (trade name: NOCCELER CZ (primary vulcanization accelerator) and NOCCELER D (secondary vulcanization accelerator), both manufactured by Ouchi Shinko Chemical Co., Ltd.) were added to the kneaded product and kneaded at 90° C., and the resultants were taken as the rubber compositions of Examples 11 to 18 and Comparative Example 11.

TABLE 6

| | | Comparative Example 11 | Example 11 | Example 12 | Example 13 | Example 14 | Example 15 | Example 16 | Example 17 | Example 18 |
|---|---|---|---|---|---|---|---|---|---|---|
| Formulation (parts by mass) | SBR | 100 | 100 | 100 | 100 | 100 | 100 | 100 | 100 | 100 |
| | Silica | 50 | 50 | 50 | 50 | 50 | 50 | 50 | 50 | 50 |
| | Silane coupling agent | 4 | 4 | 4 | 4 | 4 | 4 | 4 | 4 | 4 |
| | Polymer filler 11 | | 10 | 20 | | | | | | |
| | Polymer filler 12 | | | | 20 | | | | | |
| | Polymer filler 13 | | | | | 20 | | | | |
| | Polymer filler 14 | | | | | | 20 | | | |
| | Polymer filler 15 | | | | | | | 20 | | |
| | Polymer filler 16 | | | | | | | | 20 | |
| | Polymer filler 17 | | | | | | | | | 20 |
| | Zinc flower | 2 | 2 | 2 | 2 | 2 | 2 | 2 | 2 | 2 |
| | Stearic acid | 2 | 2 | 2 | 2 | 2 | 2 | 2 | 2 | 2 |
| | Anti-aging agent | 2 | 2 | 2 | 2 | 2 | 2 | 2 | 2 | 2 |
| | Sulfur | 1.4 | 1.4 | 1.4 | 1.4 | 1.4 | 1.4 | 1.4 | 1.4 | 1.4 |
| | Vulcanization accelerator | 0.95 | 0.95 | 0.95 | 0.95 | 0.95 | 0.95 | 0.95 | 0.95 | 0.95 |
| | Secondary vulcanization accelerator | 0.95 | 0.95 | 0.95 | 0.95 | 0.95 | 0.95 | 0.95 | 0.95 | 0.95 |
| Physical properties (index) | tanδ(0° C.) | 100 | 105 | 118 | 116 | 115 | 110 | 111 | 112 | 111 |
| | tanδ(60° C.) | 100 | 100 | 101 | 102 | 103 | 101 | 103 | 102 | 102 |
| | 23° C. hardness | 100 | 100 | 99 | 97 | 99 | 99 | 98 | 98 | 98 |

The results in Table 6 show that the vulcanized rubbers of the rubber compositions according to Examples 11 to 18 maintain the hardness, and the tan δ (0° C.) is greatly increased, but the increase of the tan δ (60° C.) is suppressed and the balance between the tan δ (0° C.) and the tan δ (60° C.) is improved.

What is claimed is:

1. A rubber composition comprising a diene rubber and a liquid crystal elastomer, wherein the liquid crystal elastomer is a liquid crystal polyurethane elastomer, the liquid crystal polyurethane elastomer is a reaction product of a mesogenic group-containing compound having at least an active hydrogen group, an isocyanate compound, a polysulfide-containing compound, and either a photopolymerizable group-containing compound or a polyfunctional compound.

2. The rubber composition according to claim 1, wherein the liquid crystal elastomer has a (liquid crystal phase)-to-(isotropic phase) transition temperature (Ti) of 20° C. or less.

3. The rubber composition according to claim 1, wherein the liquid crystal polyurethane elastomer is a reaction product of the mesogenic group-containing compound having at least the active hydrogen group, the isocyanate compound, the polysulfide-containing compound, and the photopolymerizable group-containing compound.

4. The rubber composition according to claim 1, wherein the liquid crystal polyurethane elastomer is a reaction product of the mesogenic group-containing compound having at least the active hydrogen group, the isocyanate compound, the polysulfide-containing compound, and the polyfunctional compound.

5. The rubber composition according to claim 1, wherein a loading of the liquid crystal elastomer is 1 to 50 parts by mass where a total amount of the diene rubber is 100 parts by mass.

6. The rubber composition according to claim 1, wherein the liquid crystal elastomer has a functional group that reacts with the diene rubber.

7. The rubber composition according to claim 6, wherein the functional group is a functional group containing at least a sulfur atom.

8. A pneumatic tire comprising the rubber composition according to claim 1.

9. A rubber composition comprising a diene rubber and a polymer filler containing at least a liquid crystal polymer and having an average particle diameter of 500 or less, wherein the liquid crystal polymer has a (liquid crystal phase)-to-(isotropic phase) transition temperature (Ti) of 20° C. or less.

10. The rubber composition according to claim 9, wherein the liquid crystal polymer is a liquid crystal elastomer.

11. The rubber composition according to claim 9, wherein a loading of the polymer filler is 1 to 50 parts by mass where a total amount of the diene rubber is 100 parts by mass.

12. The rubber composition according to claim 9, wherein the liquid crystal polymer is a liquid crystal polyurethane elastomer.

13. The rubber composition according to claim 12, wherein the liquid crystal polyurethane elastomer is a reaction product of a mesogenic group-containing compound having at least an active hydrogen group and an isocyanate compound.

14. The rubber composition according to claim 12, wherein the liquid crystal polyurethane elastomer is a reaction product of a mesogenic group-containing compound having at least an active hydrogen group, an isocyanate compound, and a photopolymerizable group-containing compound.

15. The rubber composition according to claim 14, wherein the liquid crystal polyurethane elastomer is an emulsion-polymerized liquid crystal polyurethane elastomer or a suspension-polymerized liquid crystal polyurethane elastomer.

* * * * *

UNITED STATES PATENT AND TRADEMARK OFFICE
CERTIFICATE OF CORRECTION

| | |
|---|---|
| PATENT NO. | : 11,434,352 B2 |
| APPLICATION NO. | : 16/856138 |
| DATED | : September 6, 2022 |
| INVENTOR(S) | : Jumpei Hayami et al. |

It is certified that error appears in the above-identified patent and that said Letters Patent is hereby corrected as shown below:

On the Title Page

(30) Foreign Application Priority Data, insert:
--Apr. 25, 2019 (JP) ...........JP2019-084662
Apr. 25, 2019 (JP) ...........JP2019-084661--

Signed and Sealed this
Eleventh Day of June, 2024

Katherine Kelly Vidal
*Director of the United States Patent and Trademark Office*